April 23, 1929. C. E. CHITTENDEN ET AL 1,709,839
MEANS FOR LOCKING THE STEERING WHEELS OF MOTOR VEHICLES
Filed Sept. 28, 1926
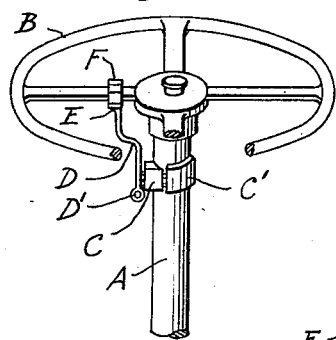
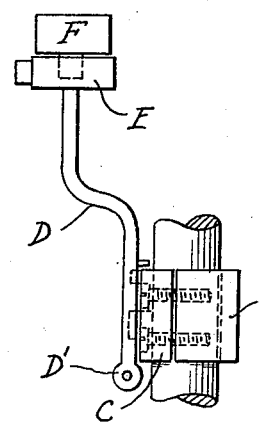
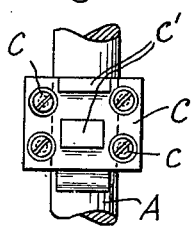
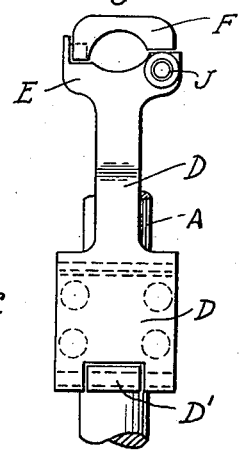
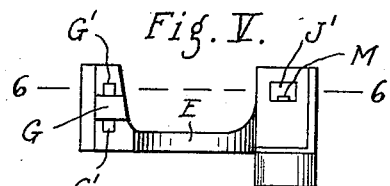
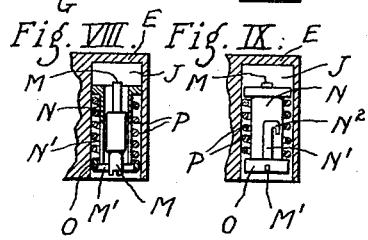
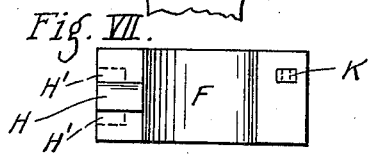
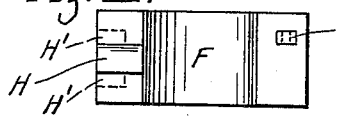
INVENTORS:
CHARLES EDWARD CHITTENDEN
AND
CHARLES FABIAN
By Pennie Davis Marvin & Edmonds
Attorneys.

Patented Apr. 23, 1929.

1,709,839

UNITED STATES PATENT OFFICE.

CHARLES EDWARD CHITTENDEN AND CHARLES FABIAN, OF AUCKLAND, NEW ZEALAND.

MEANS FOR LOCKING THE STEERING WHEELS OF MOTOR VEHICLES.

Application filed September 28, 1926, Serial No. 138,274, and in New Zealand August 14, 1926.

This invention has been devised with the object of providing means for use in locking the steering wheel of a motor vehicle from turning movement, in order thus that any unauthorized use of the vehicle may be prevented.

The said means are of a nature such as to be capable of attachment to the steering column in a manner to prevent their removal therefrom when the appliance is locked, and in the operation of the appliance, to lock the wheel to the column so that it is incapable of turning, such locking being effected through the agency of a special key provided for the purpose.

These means are illustrated in the accompanying drawings, in which:—

Figure 1 is a front view of a steering wheel and column illustrating the manner of employing the fastener.

Figure 2 is a side view of the fastener, on an enlarged scale.

Figure 3 is a front view thereof.

Figure 4 is a front view of the clamp portion of the fastener.

Figure 5 is a plan view, on a still further enlarged scale of the arm portion of the fastener.

Figure 6 is a sectional elevation of the steering wheel engaging means, taken on the line 6—6 of Figure 5.

Figure 7 is an underneath plan of the cap portion of these means.

Figures 8 and 9 are sectional detail views illustrating an approved form of lock for securing the said cap in position.

The appliance devised comprises a clamp portion adapted to be clamped around the steering column A close up beneath the wheel B, such clamp being formed of two members C and C' fitting upon the column from opposite sides and secured together by means of set screws c. Such set screws pass through the front member C and have their heads countersunk into the surface of such member, which surface its made straight but has a number of knobs c' projecting out from it, as shown more particularly in Figure 4.

Combined with this clamp, is an arm D one end of which is pivoted, as at D', to the bottom of the clamp member C in such a manner that it may turn upward to extend up the front of such member, or downward to free it. This arm, at its lower end, is made with a flat portion adapted to cover the front of the clamp when it is turned up, and formed with apertures which pass over the knobs c' and thereby hold the arm from any side movement to expose the heads of the set screws c. When therefore the arm is raised and kept raised, the set screws are covered in such a manner that no ordinary tool can have access to them to permit of the removal of the clamp from the column.

The upper end of the drum D is shaped with a cross head E which is adapted, when the arm is turned upward, to engage beneath a spoke of the wheel B and extend laterally across such spoke. There is provided for such cross head, a cap piece F which is adapted to fit down over the top of the said wheel spoke and to be locked to the cross head E so that the spoke is held between them and the wheel thus restrained from any turning movement.

The invention provides facilities for attaching and removing the said cap piece F so that the wheel may be locked by turning the arm D up and placing the cap in position, or freed by removing the cap and turning the arm down on its hinge.

In the formation of the cross head and cap piece according to the manner shown in the drawings and particularly in Figures 5 to 9 thereof, the cross head is made at one end with an upwardly projecting fin or lug G from each side of which a pin G' projects laterally. The corresponding end of the cap piece F is made with a recess H adapted to fit down over the lug G, and with notches H', one on each side of the recess, that are adapted to be passed in beneath the said pins G' and thereby to form a hinge on which the cap may turn and which hinge serves to hold that end of the cap from lifting. The opposite end of the cross piece is formed with a bore J extending laterally through it, and with an aperture J' in its top, opening down into such bore. The corresponding end of the cap is made with a tongue extension K that is shaped to turn down through the aperture and into this bore, and which tongue has a hole K' made to extend laterally through it. Consequently this end may also be locked by passing a locking pin through the said hole.

In Figures 8 and 9 a suitable form of locking pin and actuating means therefor, are shown. In this case, the locking pin M is mounted to slide in a cylinder N fitted inside the bore J, to extend longitudinally therein, and such pin at its outer end, is made fast to a small cross bar M' that projects into slots N' formed in the side of the cylinder and is attached to a ring O surrounding the cylinder. A spring P is placed around the cylinder and such spring is compressed between the ring O and the inner end of the cylinder so as thus to normally force the pin M outward to free its inner end from the aperture J', and thereby to permit of the cap tongue K being placed within or removed from such aperture. The pin is, however, adapted to be forced inward to pass through the tongue K by pressure upon its outer end, and then by a partial rotation in its cylinder to be retained in such position, by forming the inner ends of the slots N' with bayonet joint extensions $n$ (Figure 9).

The turning of the pin to effect the locking and releasing action is performed by a key fitting on to its outer end. By shaping the pin end and the key in special forms, or with wards specially arranged, the lock may be adapted to be operated only by a distinctive key so that the desired individuality may be obtained for each lock, thus fitted in these appliances.

We claim:

An automobile lock, comprising a clamp portion for attachment to the steering column, an arm hinged to said clamp and having its upper end forked for fitting over the bottom of a wheel-spoke, said fork having at one extremity a double-pin pintle formation and on the other extremity a key-controlled locking-pin, and a separate yoke member for fitting over the upper side of the spoke and having recesses on one end for hinging on said pintle formation, and a tongue on the other end for engagement by said locking pin.

In testimony whereof, we affix our signatures.

CHARLES EDWARD CHITTENDEN
CHARLES FABIAN.